Oct. 20, 1925. 1,558,293
J. RUTHS
STEAM ACCUMULATOR APPARATUS FOR STEAM PLANTS
Filed Oct. 18, 1922
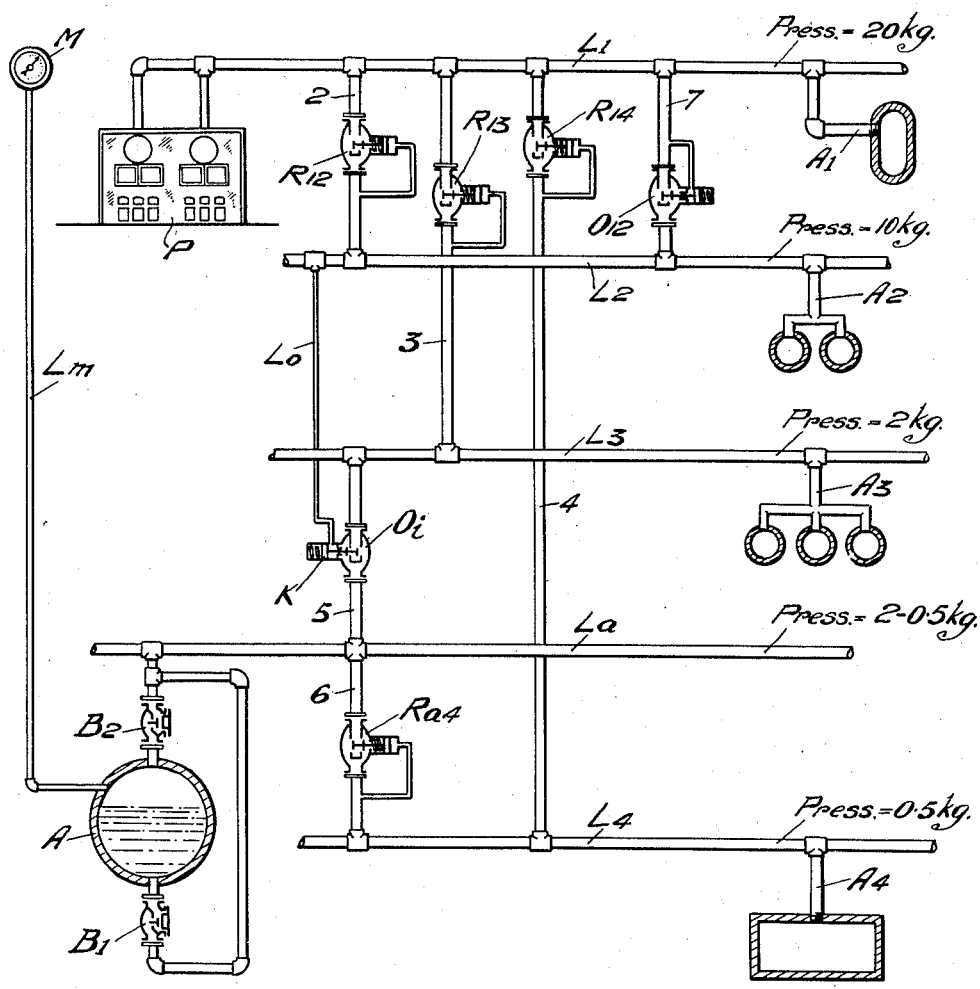
Inventor
Johannes Ruths
By Marks Clerk
Attorney Patented Oct. 20, 1925.

1,558,293

UNITED STATES PATENT OFFICE.

JOHANNES RUTHS, OF DJURSHOLM, SWEDEN, ASSIGNOR TO AKTIEBOLAGET VAPOR-ACKUMULATOR, OF STOCKHOLM, SWEDEN, A CORPORATION.

STEAM-ACCUMULATOR APPARATUS FOR STEAM PLANTS.

Application filed October 18, 1922. Serial No. 595,401.

*To all whom it may concern:*

Be it known that I, JOHANNES RUTHS, a subject of the King of Sweden, residing at 10 Torgardsvagen, Djursholm, Sweden, have invented certain new and useful Improvements in Steam-Accumulator Apparatus for Steam Plants, of which the following is a specification.

This invention relates to steam plants in which an accumulator is provided to receive and store the surplus steam not for the moment required by the steam consumers and to reject steam for use in the consumers when the steam consumption exceeds the steam supply, the object being to bring about an independence between steam generation and steam consumption so that the boilers are relieved of variations in steam consumption.

In my copending application Serial No. 335,114, filed November 1, 1919, Patent No. 1,501,623 is described and claimed a steam plant wherein the above object is carried out in a novel manner by providing a system including one or more steam generators, a main conduit and a series of secondary conduits connected therewith and adapted to supply steam to steam consumers, means to maintain different degrees of pressure in said conduits, an accumulator connected in the system and adapted to receive steam from one of the secondary conduits and a pressure operated valve posited in the connection between the accumulator and the secondary conduit from which it receives steam and operated in response to pressure in the generators or the main conduit, which is at the same pressure as the generators, so that the said valve opens or tends to open on rise of pressure in the generator and closes somewhat or tends to close on decrease of pressure in the generators.

The present invention is similar to the invention above described and identified but accomplishes the above outlined purpose in a somewhat different manner by a somewhat different arrangement and, in certain plants, constitutes an improvement thereover.

According to the present invention, the plant comprises generators, main and secondary conduits, an accumulator posited to receive steam from a secondary conduit and a pressure operated valve in the connection between the secondary conduit and the accumulator the various parts being arranged more or less as in the application referred to; the plant differing, however, in that the pressure responsive valve, instead of being actuated by generator pressure, is actuated in response to changes of pressure in one of the secondary conduits other than that from which the accumulator is supplied and in that, in a preferred form, there is provided a connection between the last-mentioned secondary conduit and the main conduit in which is situated a valve responsive to the pressure in the main conduit.

The invention will be described more in detail, reference being directed to the accompanying drawing in which is shown a diagrammatic view of a steam plant arranged in accordance with my invention and constituting one embodiment thereof.

Referring to the drawing:

P designates one or more steam generators from which steam is delivered to a main conduit $L_1$. $L_2$, $L_3$, and $L_4$ designate secondary conduits, which are connected to the main conduit by connections 2, 3 and 4 and carry substantially constant pressures of different relative values. A designates the accumulator which is connected in parallel with conduit $L_a$. $L_a$ is not a secondary conduit within the meaning given to that term herein since $L_a$ has a varying pressure being directly connected to the accumulator. The pressure in conduit $L_a$ and in the accumulator varies between the pressure of the secondary conduit $L_3$ and the secondary conduit $L_4$ in the plant selected. In each of the secondary conduits the pressure is substantially constant, though it is different in each of these secondary conduits. For example, in the plant selected to illustrate my invention, the pressure in conduit $L_1$ is 20 kg. or about 300 lbs. per sq. in.; the pressure in conduit $L_2$ is 10 kg. or about 150 lbs. per sq. in.; the pressure in conduit $L_3$ is 2 kg. or about 30 lbs. per sq. in.; the pressure in conduit $L_4$ is 0.5 kg. or about 7 lbs. per sq. in. while the pressure in the accumulator, in conduit $L_a$, in conduit 5 between conduit $L_a$ and valve $O_1$ and in conduit 6 between conduit $L_a$ and the valve $R_{a_4}$ may vary between 0.5 kg. and 2 kg. which is approximately between 7 and 30 lbs. per sq. in.

For purposes of description I term $L_a$ an accumulator conduit and where the term, "accumulator piping", is used it refers to all the piping which varies in pressure in the same manner as in the accumulator. In the drawing the accumulator piping includes the accumulator conduit $L_a$, the pipings immediately connected with the accumulator and those parts of conduits 5 and 6 which extend between conduit $L_a$ and the valves $O_1$ and $R_{a4}$ in the respective conduits.

From the main conduit $L_1$ a steam consumer $A_1$ is supplied with steam. Steam consumers $A_2$, $A_3$ and $A_4$ are supplied with steam from conduits $L_2$, $L_3$ and $L_4$ respectively.

$R_{12}$ is a reducing valve inserted in connection 2 and is actuated by the pressure behind the same so that an increase of pressure tends to close it and a decrease of pressure tends to open it in a manner well known in steam technology. The function of valve $R_{12}$ will be more fully explained below.

Reducing valve $R_{13}$ is inserted in connection 3 and serves to maintain a constant pressure in conduit $L_3$.

Reducing valve $R_{14}$ is inserted in connection 4 and serves to supply steam to conduit $L_4$ when the accumulator is discharged or nearly discharged.

Reducing valve $R_{a4}$ is inserted in connection 6 leading steam from the accumulator to conduit $L_4$ and serves to maintain a constant pressure in conduit $L_4$.

Reducing valve $R_{14}$ is adjusted to open and permit steam to flow from conduit $L_1$ to conduit $L_4$ only when reducing valve $R_{a4}$ is fully opened.

I have shown the reducing valves diagrammatically and it is to be understood that any type of reducing valve may be used.

There is arranged in the connection 5 a constrolling means $O_1$, actuated by the pressure in a secondary conduit other than that immediately in front of it, in the form illustrated by the pressure in conduit $L_2$. This valve is so constructed that it increases the flow through the same upon an increase of the pressure actuating it and decreases the flow through the same upon a decrease of pressure in contra-distinction to a reducing valve which increases the flow through the same upon decrease of the pressure which actuates it and decreases the flow through the same upon an increase of pressure. I term such a valve an "overflow" valve.

The valve $O_1$ is shown as operated by a piston K on which pressure acts on one side by way of tube $L_0$ connected to conduit $L_2$ and a spring acts on the other. This valve is more specifically described in my copending application referred to. It is obvious however that this is merely a diagrammatic showing of one form of valve which will perform the function ascribed to it, and that many modifications of this valve are possible within the scope of the present invention.

Between conduits $L_1$ and $L_2$ there is a second connection 7 in which is inserted another overflow valve $O_{12}$ which is responsive to the pressure in front of it and operates to increase its area for the flow of steam when the pressure in conduit $L_1$ rises and decreases in flow area when the same pressure decreases, thus maintaining the pressure in conduit $L_1$ constant, and serving to pass the surplus of steam over that needed by the high pressure consumers $A_1$ into the conduit $L_2$.

Reducing valve $R_{12}$ is normally closed and opens to admit steam to conduit $L_2$ only after valve $O_1$ is completely closed.

In the operation of the plant thus described, we may assume that, at a particular time, a given amount of steam is passing through valve $O_{12}$, a given amount through valve $R_{13}$, a given amount through valve $O_1$, a given amount through valve $R_{a4}$, and, assuming a surplus momentary steam generation over steam consumption, a given amount into the accumulator through check valve $B_1$. Suppose, now the pressure in conduit $L_1$ rises due to a lessening of steam consumption in $A_1$. Valve $O_{12}$ then opens wider, causing an increase of pressure in conduit $L_2$, which, in turn, causes valve $O_1$ to open more, which, in turn, causes a drop of pressure in conduit $L_3$ thereby opening valve $R_{13}$, thereby causing the pressure in conduit $L_1$ to drop which somewhat closes valve $O_{12}$. Thus more steam is passed to the accumulator and equilibrium is regained.

Suppose the pressure in conduit $L_2$ rises due, for example, to decreased consumption in $A_2$. The valve $O_1$ then opens, whereupon the pressure in conduit $L_3$ drops, causing valve $R_{13}$ to open and valve $O_{12}$ to close, thus also increasing the flow of steam toward the accumulator and causing a drop of pressure in conduit $L_2$ back to normal.

Suppose the pressure in conduit $L_1$ drops, the steps of operation then occurring are as follows: Valve $O_{12}$ closes somewhat. The pressure in conduit $L_2$ drops. Valve $O_1$ closes somewhat or may even completely close. The pressure in conduit $L_3$ rises. Valve $R_{13}$ closes somewhat. The pressure in conduit $L_1$ rises, returning to its normal value.

If in this operation the flow through $O_1$ becomes less than what is needed by the low pressure consumers $A_4$, valve $R_{a4}$ opens wider and steam flows from the accumulator through check valve $B_2$.

If the accumulator becomes discharged valve $R_{14}$ opens which may cause valve $O_{12}$ to be completely closed. Closing of valve $O_{12}$ causes a drop of pressure in conduit $L_2$ which in turn closes valve $O_1$. When valve $O_1$ has closed valve $R_{12}$ opens admitting steam to conduit $L_2$. Thus a condition may arise where all reducing valves are open and all over-flow valves closed.

From the above description it is believed that the operation of my plant can be understood without explaining the operation under conditions other than the above. There will, of course, be cases when the consumption of one consumer will increase and another decrease. The variations in the consumption of steam may be very complex but, in each case the accumulator can take care of the variations for all normal variations of the plant.

In the form of plant above described, a pressure gage M is shown connected by pipe $L_m$ to the accumulator, the purpose of which gage is described in my co-pending application Serial No. 305,622, and as this gage is not directly concerned with the present improvement, it will not be necessary to describe the same more fully herein.

Although I have shown and described one exemplification of my invention, it is evident that those skilled in the art to which it appertains may make various changes in the arrangement of parts without departing from the spirit and scope of the invention.

Having thus described my invention, what I claim is:

1. In a steam plant, in combination, a steam generator, a steam conduit system connected therewith, an accumulator and a plurality of steam consumers in said conduit system, a main conduit in said conduit system, a secondary conduit in said conduit system having a lower pressure than in said main conduit, a connection adapted to receive steam from said secondary conduit, means to pass steam from said connection to said accumulator, a third conduit in said conduit system, having a pressure different than that in the afore-mentioned conduits, means in said connection to control the flow of steam therethrough responsive to the pressure in said third conduit.

2. In a steam plant, in combination, a steam generator, a steam conduit system connected therewith, a conduit in said conduit system having a lower pressure than in the generator and connected to receive steam from said generator, an accumulator, a connection between said conduit and said accumulator, a second conduit in said conduit system having a pressure different than said first mentioned conduit and different than said generator, means to conduct steam from said generator to said second conduit, means in said connection responsive to the pressure in said second conduit to increase the flow toward the accumulator when the pressure in the second conduit rises and to decrease the flow toward the accumulator when the pressure in the second conduit decreases and steam consumers connected to said conduits.

3. In a steam plant, in combination, a steam generator, a main conduit connected therewith, a plurality of secondary conduits receiving steam from the main conduit, means to maintain different degrees of pressure in the respective conduits, an accumulator, means adapted to receive steam from one of said secondary conduits and controlled by pressure in another of said secondary conduits to increase the flow therethrough when the controlling pressure rises and decrease the flow therethrough when the pressure decreases, a communication between said means and said accumulator and means to receive and use steam from the conduits and accumulator.

4. In a steam plant, in combination, a steam generator, a main conduit connected therewith, a secondary conduit having a lower pressure than said main conduit, means to conduct steam from said main conduit to said secondary conduit, a second secondary conduit having a lower pressure than said first-mentioned secondary conduit, means to conduct steam from said generator to said second secondary conduit, an accumulator, an accumulator conduit, a connection between said second secondary conduit and said accumulator conduit, a valve in said connection, pressure responsive means to operate said valve, a tube connecting said pressure responsive means with said first mentioned secondary conduit, said conduits being adapted to supply steam to steam consumers.

5. In a steam plant in combination, a steam generator, a main conduit connected therewith, a secondary conduit, a connection between said main conduit and said secondary conduit, an overflow valve in said connection, a second secondary conduit adapted to carry a lower pressure than in said first-mentioned secondary conduit, a third secondary conduit adapted to carry a lower pressure than in said second secondary conduit, an accumulator, accumulator piping adapted to receive steam from one of said secondary conduits and deliver steam to another of said secondary conduits, means associated with said accumulator piping to control the flow of steam thereinto responsive to the pressure in a secondary conduit other than that from which the accumulator piping receives steam and steam consumers connected to said conduits.

6. In a steam plant, in combination, a steam generator, a main conduit connected therewith, a plurality of secondary conduits receiving steam from the main conduit and adapted to supply steam to steam consumers, a plurality of means acting to maintain different degrees of pressures in the respective conduits, a steam accumulator, a connection between said accumulator and one of said secondary conduits, means in said connection responsive to the pressure in another of said secondary conduits to control the flow of steam therethrough.

7. In a steam plant in combination, a steam generator, a main conduit connected therewith, a first secondary conduit ($L_2$), a second secondary conduit ($L_3$), an accumulator conduit ($L_a$), a third secondary conduit ($L_4$), a connection (3) between said main conduit and said second secondary conduit ($L_3$), a reducing valve ($R_{13}$) in said connection (3), a connection (7) between said main conduit and said first secondary conduit ($L_2$), a valve ($O_{12}$) in said last mentioned connection (7) operated by the pressure in the main conduit to increase the flow therethrough when the main conduit pressure increases and decrease the flow therethrough when the main conduit pressure decreases, a connection (5) between said second secondary conduit ($L_3$) and said accumulator conduit ($L_a$) a valve ($O_1$) in said last-mentioned connection (5), actuated by the pressure in the first secondary conduit ($L_2$) and adapted to increase the flow therethrough when the actuating pressure increased and decrease the flow therethrough when the actuating pressure decreases, an accumulator connected to said accumulator conduit, a connection (6) between said accumulator conduit and said third secondary conduit, a reducing valve ($R_{a4}$) in said last-mentioned connection (6) and steam consumers connected to some of said conduits.

In testimony whereof I affix my signature.

JOHANNES RUTHS.